(12) United States Patent
Yang et al.

(10) Patent No.: US 9,305,021 B2
(45) Date of Patent: Apr. 5, 2016

(54) SYSTEMS AND METHODS FOR PRESENTING POINT OF INTEREST (POI) INFORMATION IN AN ELECTRONIC MAP, AND STORAGE MEDIUM THEREOF

(71) Applicant: INSTITUTE FOR INFORMATION INDUSTRY, Taipei (TW)

(72) Inventors: Ren-Dar Yang, Hsinchu (TW); Chun-Hung Lu, Taipei (TW); Yi-Hsun Lee, Taichung (TW); Wen-Nan Wang, New Taipei (TW); Tai Hung Chen, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 240 days.

(21) Appl. No.: 13/906,574

(22) Filed: May 31, 2013

(65) Prior Publication Data

US 2014/0059060 A1    Feb. 27, 2014

(30) Foreign Application Priority Data

Aug. 22, 2012   (TW) .............................. 101130355 A (51) Int. Cl.
    *G06F 17/30* (2006.01)
(52) U.S. Cl.
    CPC .................. *G06F 17/30241* (2013.01)
(58) Field of Classification Search
    CPC combination set(s) only.
    See application file for complete search history.

(56) References Cited

U.S. PATENT DOCUMENTS

| 7,949,642 | B2 | 5/2011 | Yang et al. | |
|---|---|---|---|---|
| 8,718,929 | B2* | 5/2014 | Heo et al. | 701/424 |
| 2005/0114016 | A1* | 5/2005 | Kim et al. | 701/208 |
| 2005/0223024 | A1* | 10/2005 | Hyun et al. | 707/102 |
| 2009/0293011 | A1 | 11/2009 | Nassar | |
| 2011/0154260 | A1* | 6/2011 | Wang et al. | 715/823 |
| 2011/0302191 | A1* | 12/2011 | Moroz | 707/769 |

FOREIGN PATENT DOCUMENTS

| TW | 200829880 A | 7/2008 |
|---|---|---|
| TW | 201116802 A | 5/2011 |

* cited by examiner

*Primary Examiner* — Etienne Leroux
(74) *Attorney, Agent, or Firm* — Birch, Stewart, Kolasch & Birch, LLP (57) ABSTRACT

A map system for presenting Point of Interest (POI) information is provided with an interface module, a storage unit, and a processing module. The interface module is coupled to a display device and provides an operation interface for receiving a search query and a condition of time period. The storage unit stores a plurality of POIs data and verified data of the POIs each corresponding to a respective one of different time periods. The processing module filters the POIs and the verified data according to the search query and the condition of time period to generate an electronic map, and displays the electronic map to present the filtered POIs via the interface module and the display device.

15 Claims, 8 Drawing Sheets

FIG. 8

SYSTEMS AND METHODS FOR PRESENTING POINT OF INTEREST (POI) INFORMATION IN AN ELECTRONIC MAP, AND STORAGE MEDIUM THEREOF

CROSS REFERENCE TO RELATED APPLICATIONS

This application claims priority of Taiwan Patent Application No. 101130355, filed on Aug. 22, 2012, the entirety of which is incorporated by reference herein.

BACKGROUND OF THE INVENTION

1. Field of the Invention

The invention generally relates to the presentation of a Point of Interest (POI) information map, and more particularly, to the technique for using verified data of the POIs corresponding to different time periods to present only verified POIs in an electronic map.

2. Description of the Related Art

Conventionally, the method for presenting POIs in an electronic map generally involves the steps of searching a specific database according to a search query input by a user, and then presenting all of the searched POIs in the electronic map. Taking the Google Map application as an example, it provides a service interface for a user to input a shop name, searches databases or the Internet for geographic information of one or more shops matching the shop name, and finally, presents the searched shop(s) and the area where the searched shop(s) is(are) located by an electronic map via the service interface. However, as time goes by, data of the searched shop(s) may be outdated or incorrect because the searched shop(s) has been moved or closed, and it would reflect upon the reliability of the map. For this reason, the user needs to double-check the data on the map or consider the reliability of map. It is burdensome for the user.

Figure 1:
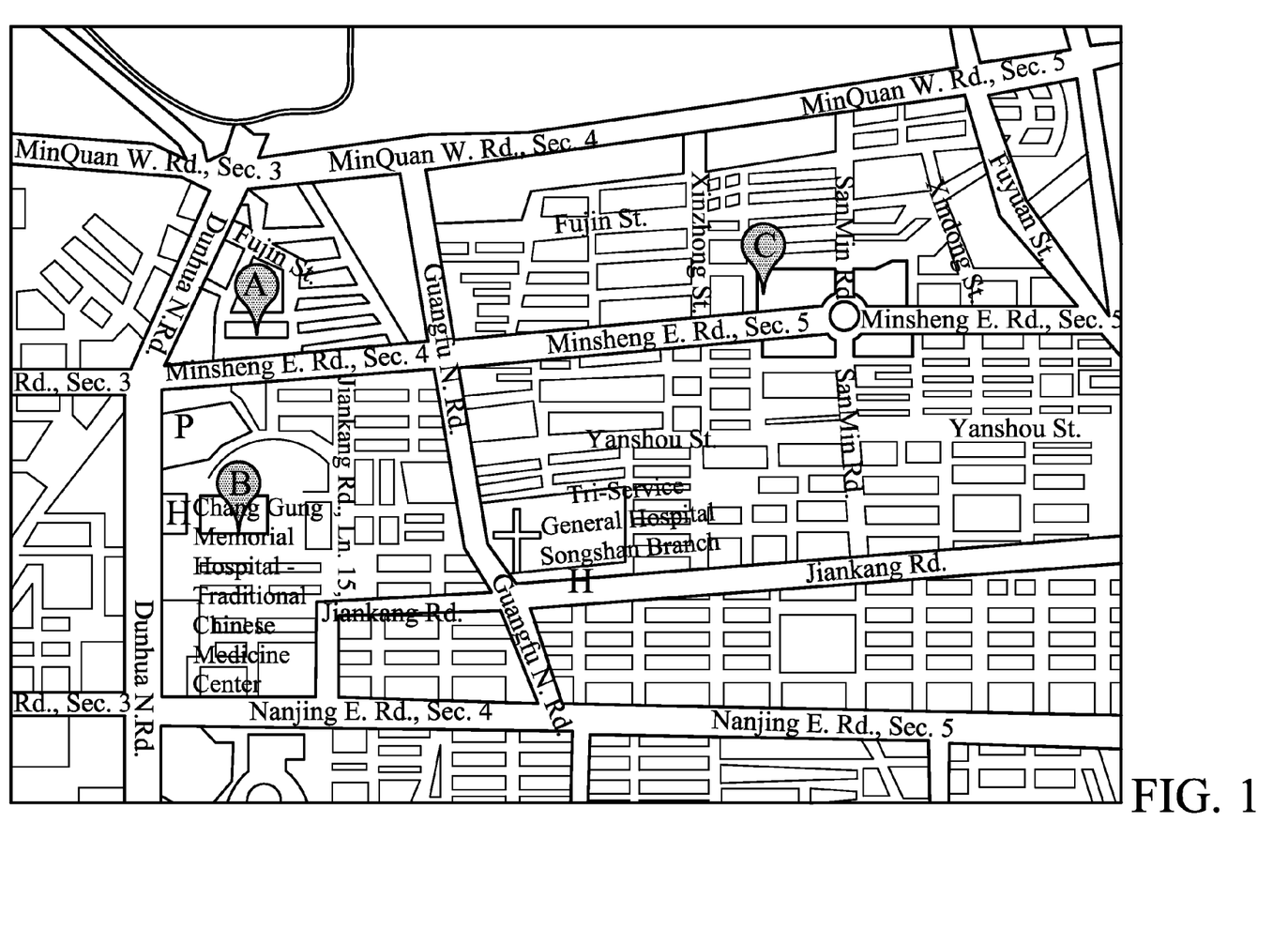
FIG. 1 is an exemplary diagram illustrating a map search using the Google Map application.

FIG. 1 is an exemplary diagram illustrating a map search using the Google Map application. For a user inputting a search query—"XX restaurant", different geographic information and various kinds of discussions are searched from databases and the Internet and presented on the electronic map. Most search results come from the iPeen website and indicate that the XX restaurant is located in the denoted A spot in the electronic map, and other search results indicate that the XX restaurant is located in the denoted B or C spot in the electronic map. The user has to check and confirm the displayed information on the electronic map by other information, so as to know that the XX restaurant located in the denoted C spot is closed in the 2009 year, the XX restaurant located in the denoted A spot is moved to the denoted B spot in the 2010 year, and the XX restaurant is still open at the denoted B spot lately. That means the correct location of the XX restaurant is in the denoted B spot, and the denoted A and C spots are incorrect search results due to outdated information from the database or Internet. Thus, by using the conventional map search techniques, e.g., the Google Map application, it is inconveniences for the users to obtain the search results containing incorrect, outdated, or unverified information.

BRIEF SUMMARY OF THE INVENTION

In order to solve the aforementioned problems, the invention proposes systems and methods for presenting POI information in an electronic map, and a machine-readable storage medium thereof, wherein the POI information is verified.

In one aspect of the invention, a map system for presenting POI information is provided. The map system comprises an interface module, a storage unit, and a processing module. The interface module is coupled to a display device and provides an operation interface for receiving a search query and a condition of time period. The storage unit stores a plurality of POIs data and verified data of the POIs each corresponding to a respective one of a plurality of time periods. The processing module filters the POIs and the verified data according to the search query and the condition of time period to generate an electronic map, and displays the electronic map to present the filtered POIs via the interface module and the display device.

In another aspect of the invention, a method for presenting POI information in an electronic map, executed by a processor, is provided. The method comprises the steps of: providing an operation interface for receiving a search query and a condition of time period; retrieving, from a storage unit, a plurality of POIs data and verified data of the POIs each corresponding to a respective one of a plurality of time periods; filtering the POIs and the verified data according to the search query and the condition of time period to generate the electronic map; and displaying the electronic map to present the filtered POIs via a display device.

In yet another aspect of the invention, a machine-readable storage medium is provided. The machine-readable storage medium comprises a computer program, which, when executed, causes an electronic device to perform a method for presenting POI information in an electronic map. The method comprises the steps of: providing an operation interface for receiving a search query and a condition of time period; retrieving, from a storage unit, a plurality of POIs data and verified data of the POIs each corresponding to a respective one of a plurality of time periods; filtering the POIs and the verified data according to the search query and the condition of time period to generate the electronic map; and displaying the electronic map to present the filtered POIs via a display device.

Other aspects and features of the present invention will become apparent to those ordinarily skilled in the art upon review of the following descriptions of specific embodiments of the systems and methods for presenting a POI information map, and a machine-readable storage medium thereof.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles, characteristics, and advantages of the invention, with preferred embodiments and accompanying drawings.

Figure 2:
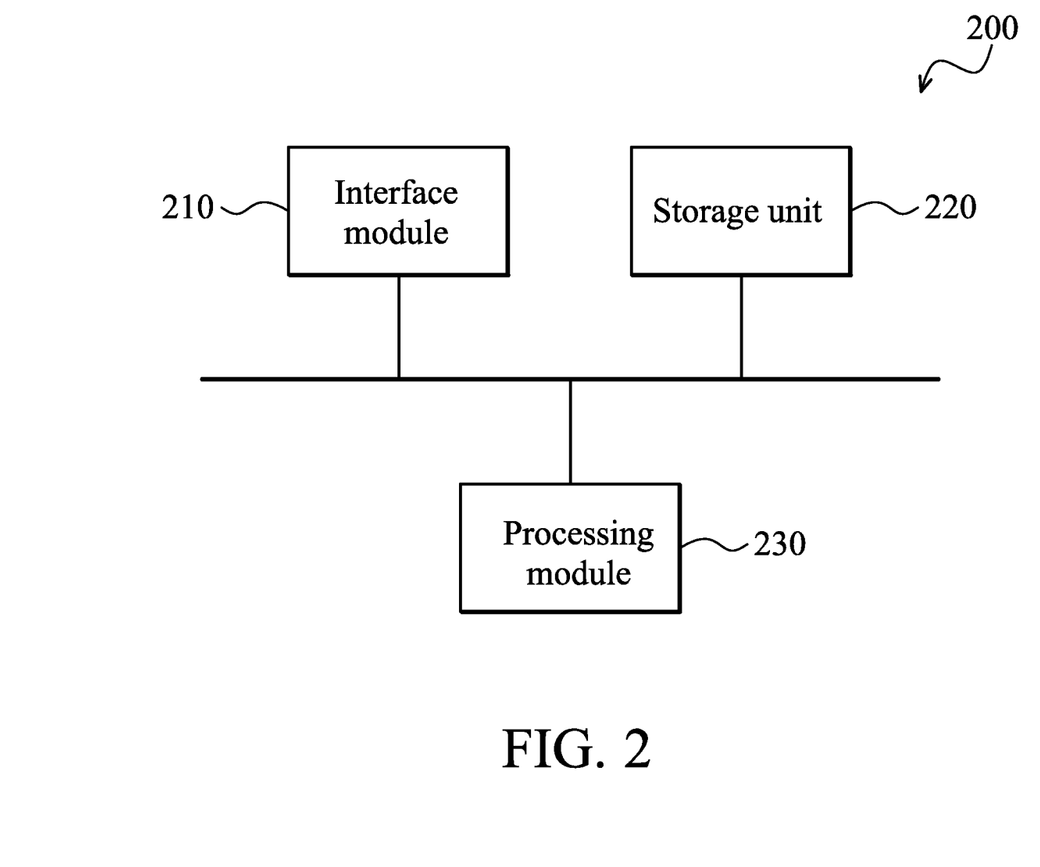
FIG. 2 is a diagram illustrating a map system for presenting POI information according to an embodiment of the invention.

FIG. 2 is a diagram illustrating a map system for presenting POI information according to an embodiment of the invention. The map system 200 comprises an interface module 210, a storage unit 220, and a processing module 230. The interface module 210 is coupled to a display device, and is used to provide an operation interface for receiving a search query and a condition of time period. The operation interface may be a Man-Machine Interface (MMI), software interface, touch screen, keyboard/pad, mouse, microphone and speaker (for sound control), or may be any combination of the above. In a preferred embodiment, the operation interface provided by the interface module 210 may be an MMI for receiving user inputs as the search query and the condition of time period. Maybe the operation interface can generate prompts for a user to input information and then receiving the input information as the search query and the condition of time period. In another embodiment, the operation interface provided by the interface module 210 may comprise a speaker, microphone, and keyboard, wherein the speaker may output the options of different search queries and conditions of time period for a user, the input can be the key-in signal form the keyboard or the user's voice form the microphone may by the user. The mentioned display device (not shown) may be a Cathode Ray Tube (CRT) or Liquid Crystal Display (LCD) screen/panel, touch screen, Plasma screen/panel, or any device with displaying functionality. In other embodiments, the display device (not shown) may be a touch screen incorporated into the interface module 210, and the touch screen may be provided as the operation interface and the display device. The processing module 230 may be a general-purpose processor, Micro-Control Unit (MCU), or any firmware with processing capability (e.g., a processor or processing chip with software programmed therein), which is used to retrieve, from the storage unit 220, POIs data and verified data of the POIs each corresponding to a respective one of a plurality of time periods and filtering the POIs and the verified data according to the search query and the condition of time period to generate an electronic map, and then displaying the electronic map to present the filtered POIs via the interface module 210 and the display device (not shown). The storage unit 220 may be a memory (e.g., Random Access Memory (RAM), Flash memory, or Non-Volatile Random Access Memory (NVRAM), etc.), a magnetic storage device (e.g., magnetic tap or hard disk), an optical storage device (e.g., Compact Disc Read-Only Memory (CD-ROM)), or any device with data storing functionality, such as a computer, server, or database, etc. The storage unit 220 is used for storing data, such as a plurality of POIs data and the verified data of the POIs each corresponding to a respective one of the plurality of time periods. Also, the storage unit 220 may be used for storing the instruction sets for the operation of the processing module 230. In another embodiment, the map system 200 may further comprise a network communication module (not shown) (e.g., any product available in the market using known technology for network communication) which is responsible for providing network communications between the interface module 210, the storage unit 220, the processing module 230, and the display device (not shown) when they are located separately in different places, so that they may be linked together and further linked to a remote database for retrieving data.

For example, the map system 200 may be implemented in any electronic device having a processor, such as a smartphone, Personal Navigation Device (PND), portable gaming device, multimedia player, Multi Media Kiosk (e.g., ibon, FamiPort, and Life-ET), Digital Signage, Personal Digital Assistant (PDA), or computer (e.g., Personal Computer (PC), tablet PC, notebook PC, netbook PC), etc. Alternatively, the map system 200 may be implemented as a distributed system, i.e., the components of the map system 200 are respectively implemented in different electronic devices which operate in coordination with each other to form the map system 200. For instance, the interface module 210 and the display device (not shown) may be implemented in a user device, and the storage unit 220 and the processing module 230 may be implemented in a remote server, wherein each of the user device and the remote server has a respective network communication module for communications therebetween, and the invention is not limited thereto.

Figure 3:
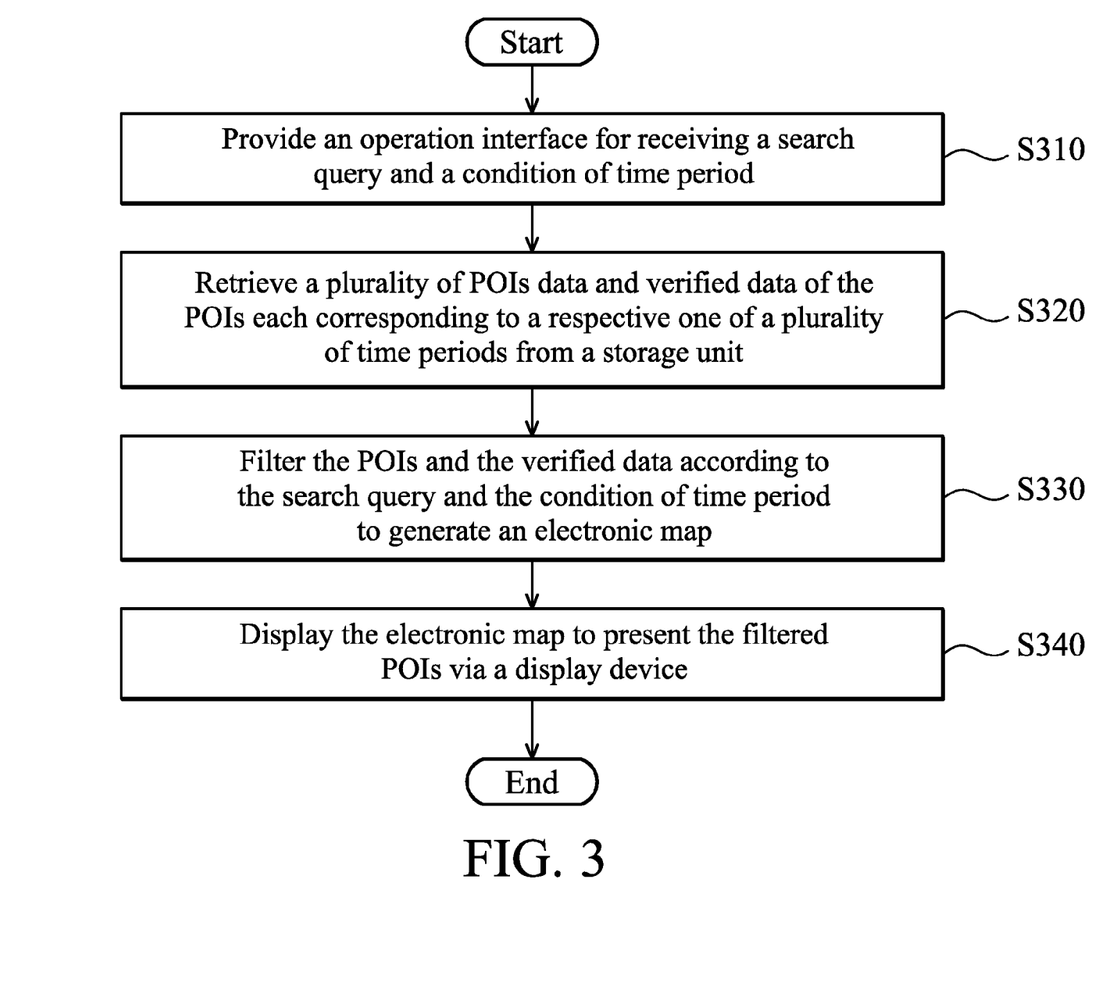
FIG. 3 is a flow chart illustrating the method for presenting POI information in an electronic map according to an embodiment of the invention.

FIG. 3 is a flow chart illustrating the method for presenting POI information in an electronic map according to an embodiment of the invention. The method may be executed by a processor of any electronic device, or the processing module 230 in the map system 200. The method comprises the following steps. An operation interface is provided for receiving a search query and a condition of time period (step S310). Specifically, the processor may provide the operation interface via an interface module (e.g., the interface module 210) for receiving the search query and the condition of time period from a user, wherein the embodiments of the provision of the operation interface via the interface module are as described above with respect to FIG. 2. In one embodiment, the processor and the interface module may be incorporated into a single electronic device. In another embodiment, the processor and the interface module may be implemented separately in different electronic devices. For example, the interface module may be implemented in a user device, and the processor may be disposed in a remote server of a service provider. Subsequently, the processor retrieves, from a storage unit, a plurality of POIs data and verified data of the POIs each corresponding to a respective one of a plurality of time periods (step S320). Next, the processor filters the POIs and the verified data according to the search query and the condition of time period to generate an electronic map (step S330). After that, the processor displays the electronic map to present the filtered POIs via a display device (e.g., a display device disposed in the user device) (step S340). Consequently, the method for presenting POI information in an electronic map may present only the verified POIs with the received condition of time period and exclude the incorrect or outdated POIs.

Figure 4:
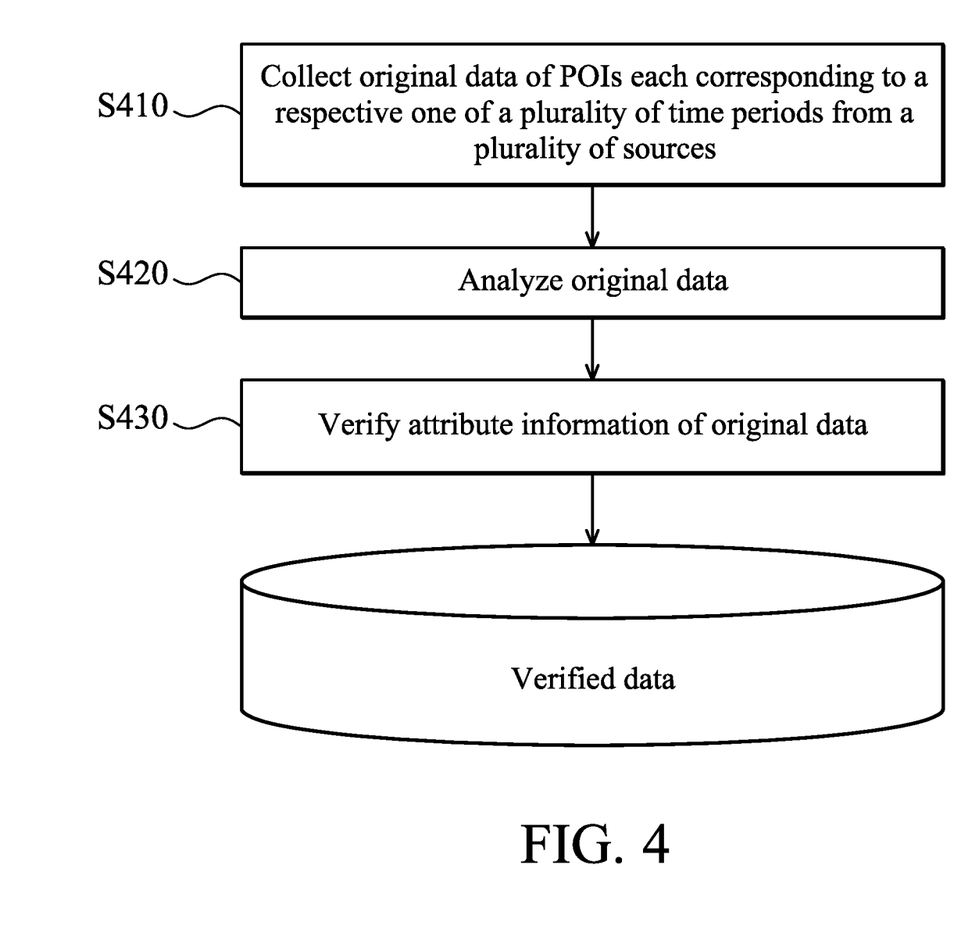
FIG. 4 is a flow chart illustrating the data verification according to an embodiment of the invention.

More specifically, the method for presenting POI information in an electronic map may further comprise the step of verifying data before the step S310, to build up the POIs data and the verified data of the POIs each corresponding to a respective one of the plurality of time periods in the storage unit. FIG. 4 is a flow chart illustrating the data verification according to an embodiment of the invention. The steps of the data verification may also be executed by the same processor in FIG. 3 or the processing module 230 in the map system 200. To begin, in the step S410, the original data of the POIs each corresponding to a respective one of the plurality of time periods is collected from a plurality of sources, wherein the POIs may comprise scenic spots, restaurants, shops/stores, buildings/structures, gas stations, banks, or any place that people may be interested in. The POIs data may be obtained from a predetermined list of POIs, which maintains the names of the POIs. The sources may be any data source on the Internet, such as general websites, blog websites (e.g., Wretch), Internet forums (e.g., iPeen), social network (e.g., Facebook), web albums (e.g., Flickr), or others. Alternatively, the sources may comprise a database or storage device, e.g., a built-in or native database (not shown) of the map system 200 (or the built-in or native database may be incorporated into the storage unit 220), a remote database linked by the network communication module (not shown) in the map system 200, or a storage device disposed in the user device, wherein the database or storage device may be periodically connected to the Internet for updating the data stored therein, or the data stored therein may be updated by users manually.

Subsequently, in the step S420, the original data of each of the POIs corresponding to each of the plurality of time periods is analyzed to generate attribute information for the original data of each of the POIs corresponding to each of the time periods. That is, the processor or the processing module 230 analyzes the original data to generate respective attribute information for each of the POIs corresponding to each of the time periods. To further clarify the step S420, the attribute information may be generated by analyzing the semantics of the original data. Taking a shop being a POI as an example, the semantics analysis may comprise the steps of: retrieving common attribute description, from the contents, tags, titles, notations, abstracts, and/or descriptions of the articles having the name of the shop appearing therein by using the techniques of word classification, maximum matching, and word frequency, etc. The common attribute description may be type, address, telephone, price, business hour, website address, merchandise, service, discount, evaluation, landmark, etc., and may represent the attribute information.

To be more specific, in the step S420, when the sources comprise social websites and web albums, the processor or the processing module 230 may analyze the tags, titles, and descriptions of the photographs and checkin information collected from the social websites and web albums, to generate the attribute information for the original data. Taking a shop being a POI as an example, the processor or the processing module 230 may use the coordinate of the shop to check if the shop appears in any photograph from the web albums, or if anyone's checkin occurred in the shop, wherein the checking may be performed by examining the tags, titles, and descriptions of the photographs and checkin information.

After that, in the step S430, the processor or the processing module 230 verifies the attribute information to generate the verified data of the POIs corresponding to each of the time periods. Specifically, the processor or the processing module 230 may compare the generated attribute information with standard attribute information of each of the POIs to determine a number of respective original data whose attribute information matches the standard attribute information of the respective POI, and then generate the verified data according to the number of the respective original data. In one embodiment, the number of the respective original data may be used as the verified data, and the POIs with the verified data being greater than zero may be determined as the filtered POIs (i.e., the verified POIs). In another embodiment, the verified data of a respective POI may be set to indicate that the respective POI has been successfully verified when the respective original data has an attribute-counted number which exceeds a threshold value, wherein the attribute-counted number is an amount for the attribute information of the respective original data, which is the same as the standard attribute information of the respective original data. Otherwise, the verified data of a respective POI may be set to indicate that the respective POI has not been successfully verified when the respective original data has an attribute-counted number which is less than the threshold value. In yet another embodiment, a respective weight may be set for each of the sources, and the technique of PageRank or weighted voting may be used to accumulate the products of the number of the respective original data from each of the sources and the corresponding weight, to generate the verified data. For example, the attribute information generated by analyzing the checkin information from the social websites or the photographs from the web albums may be set with a higher weight than the attribute information generated by analyzing the articles from the blog websites and web forums. In addition, the processor or the processing module 230 may adjust the weights according to the time information and discussion degree (e.g., whether the discussion continues, or the popularity if the discussion) in the attribute information of the POIs. For example, the attribute information generated by analyzing the articles with discussions involving a relatively large number of people is set with a larger weight than the attribute information generated by analyzing the articles with discussions involving a relatively small number of people. Alternatively, the attribute information generated by analyzing the articles with continuing discussions is set with a larger weight than the attribute information generated by analyzing the articles with discussions having no activity.

Figure 5:
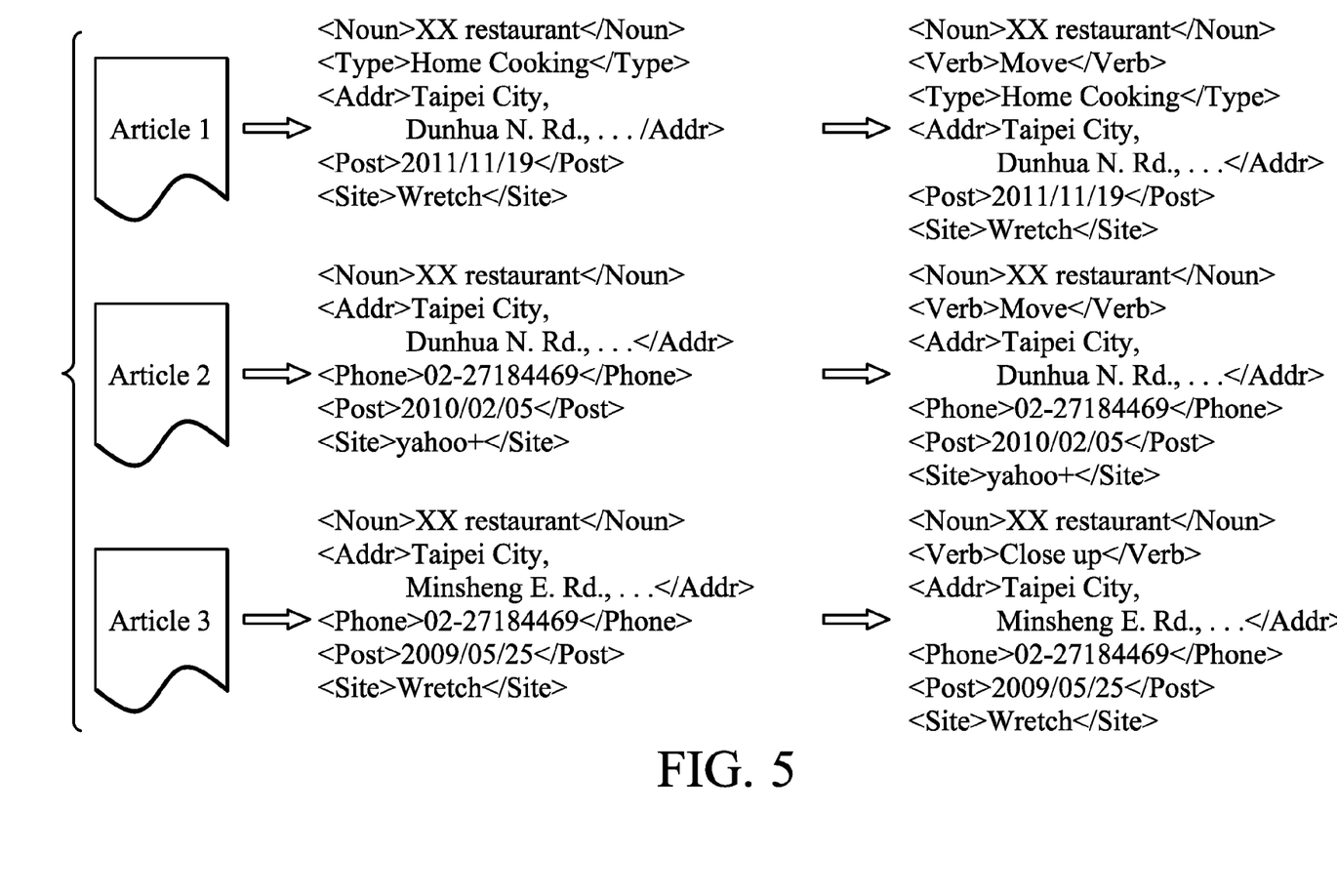
FIG. 5 is a schematic diagram illustrating the retrieval of attribute information of POIs from articles according to an embodiment of the invention.

More specifically, in order to identify the events in the original data during the data verification, the processor or the processing module 230 may analyze the original data by the published date of the articles, to retrieve the attribute information of a certain words (e.g., particular keywords or the words with high word frequency) and then add word correlations between the words, as shown in FIG. 5. For the adding of the word correlations, the correlations between verbs and nouns may be established first according to a concept dictionary of a particular language (e.g., Chinese), and then the essential correlative words may be found from the articles according to the correlations between verbs and nouns. For example, the words, such as "move", "close up", "re-open", "re-construct", or "for sale", subsequent to the name of a shop may be taken as the essential correlative words. The essential correlative words may be used to represent the events associated with the shop. For example, when the number of the original data of a particular POI corresponding to a particular time period, which has the essential correlative words, such as "move", "close up", or "for sale", appearing therein exceeds an event threshold, the occurrence of a corresponding event may be determined for the particular POI and the verified data of the POI may be updated accordingly. That is, the verified data of the POI corresponding to the subsequent time periods is configured as being unverified. Thus, the closed or moved shops will not be presented in the electronic device with the time condition being specified to the subsequent time periods. Alternatively, when the verified data is generated by using the technique of weight setting as described above, an additional parameter may be added in the product accumulation, wherein the parameter comprises the number of the original data which has the essential correlative words, such as "move", "close up", or "for sale", etc., appearing therein, and a corresponding weight for the essential correlative words. At last, the processor or the processing module 230 may store the verified data in the storage unit 220.

In another embodiment, a manual check may be further performed for the verified data to improve the credibility and adjust the data verification process, e.g., adjust the parameters for the semantics analysis, or adjust the weight settings, etc., according to the result of the manual check. In addition, the processor or the processing module 230 may periodically perform the data verification process to update the verified data.

To further clarify, during the data verification process, the corresponding time information may be retrieved and stored for the case where the search query comes with a condition of time period. Taking the blog websites, web forums, or other web pages as an example, if a specific date other than the published date appears in an article during the analysis of the original data, then it is preferred to use the specific date as the time information. Otherwise, if no specific date other than the published date appears in an article during the analysis of the original data, then it is preferred to use the published date as the time information. If the article does not have a published date and no specific date appears in the article, then it is preferred to use the time when the article is collected as the time information. Regarding the sources, such as social websites and web albums, if the photographs or checkin information comprise time information, the time information is stored. Otherwise, if the photographs or checkin information does not comprise any time information, the time when the photographs or checkin information is collected is stored as the time information.

Figure 6:
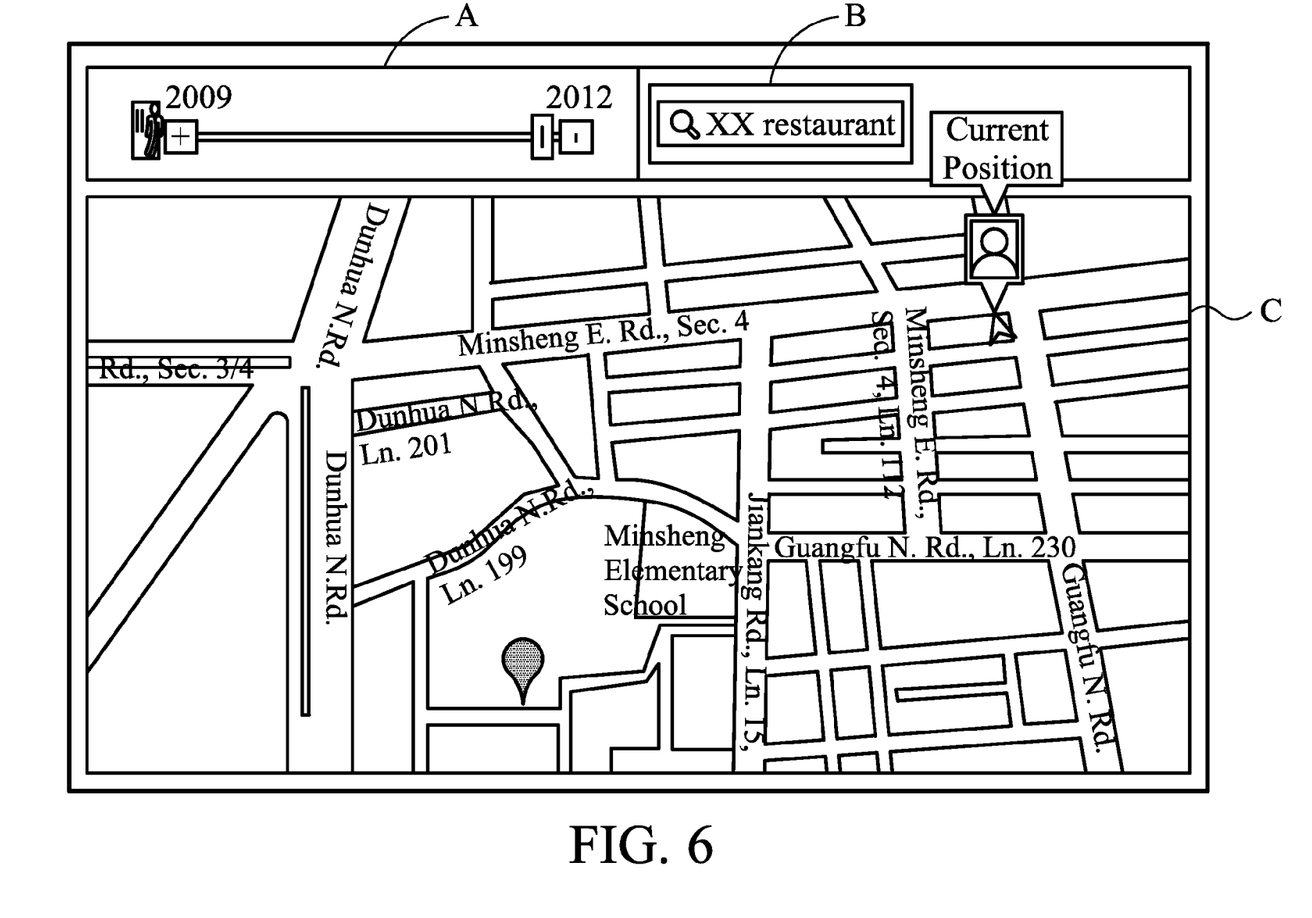
FIG. 6 is a schematic diagram illustrating the interface presentation according to an embodiment of the invention.

In the front-end interface presentation, the interface module 210 first provides an operation interface comprising a search input column and a time scroller for the user to input a search query and a condition of time period, respectively, and the processor or the processing module 230 receives the search query and the condition of time period via the interface module 210. Alternatively, in another embodiment, the operation interface may further comprise a geographic area input column for the user to input a geographic area condition. FIG. 6 is a schematic diagram illustrating the interface presentation according to an embodiment of the invention. In the denoted A block of the interface presentation, an operable time scroller is provided for the user to operate and input the condition of time period. For example, if the user operates the time scroller to indicate the 2010 year, then the condition of time period refers to a predetermined time period reversing from the 2010 year. Assuming that the predetermined time period is a year, the condition of time period refers to the time period between the years of 2009 and 2010. Alternatively, in the denoted A block of the interface presentation, a drop-down list may be provided instead, which comprises a plurality of predetermined conditions of time period for the user to select. For example, the predetermined conditions of time period may comprise "the instant moment", "three months ago", and "half a year ago", etc.

In the denoted B block of the interface presentation, a search input column is provided for the user to input the search query, e.g., the name of the search target. In the denoted C block of the interface presentation, an electronic map is provided, which is a plane map with X-Y coordinates for a specific geographic area. Moreover, for inputting the geographic area condition, the user may move the X-Y coordinate scrollers or touch and drag on the electronic map to modify the displayed geographic area, and adjust the scale on the electronic map, operate the function menu on the electronic map, or operate the mouse scroll wheel to enlarge or reduce the displayed geographic area. That is, the electronic map may be controlled in specific ways to replace the geographic area input column for inputting the geographic area condition.

In this embodiment, the condition of time period indicates the 2012 year, and the search query indicates "XX restaurant". The processor or the processing module 230 may filter the POIs and the verified data of the POIs stored in the storage unit 220 according to the condition of time period and the search query, and then display the electronic map to present the filtered POIs via the interface module 210 and the display device (not shown), as shown in FIG. 6. Since the data stored in the storage unit 220 is verified, the interface module 210 only presents, in the electronic map, the verified "XX restaurant" conforming to the condition of time period, instead of the incorrect or outdated "XX restaurant". In addition, the interface module 210 may further indicate the current position of the user for reference.

Figure 7:
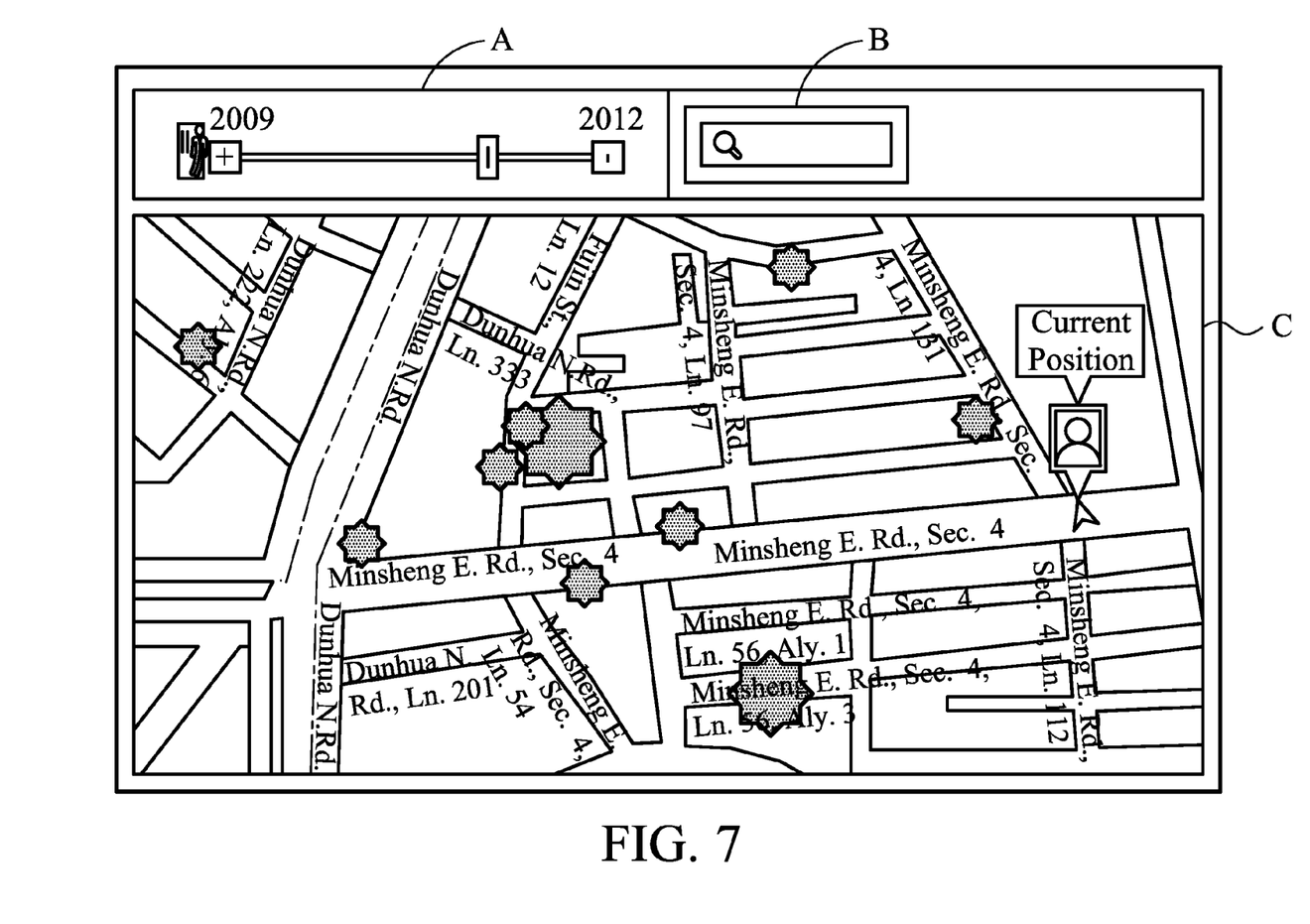
FIG. 7 is a schematic diagram illustrating the interface presentation according to another embodiment of the invention.

FIG. 7 is a schematic diagram illustrating the interface presentation according to another embodiment of the invention. Similar to FIG. 6, the denoted A, B, and C blocks of the interface presentation provide an operable time scroller, a search input column, and an electronic map, respectively. In this embodiment, the condition of time period, which is indicated by the time scroller, is set to the 2011 year, and the geographic area condition of the search is set to an area around the Minsheng East Road, Section 4 by the user operating the X-Y coordinates of the electronic map. In response to the search input, the processor or the processing module 230 filters the POIs and the verified data of the POIs stored in the storage unit 220 according to the condition of time period and the geographic area condition, and then displays the electronic map to present the filtered POIs via the interface module 210. Since the data stored in the storage unit 220 is verified, the interface module 210 only presents, in the electronic map, the verified POIs conforming to the condition of time period in the area around the Minsheng East Road, Section 4, instead of the incorrect or outdated POIs in the area.

More specifically, the processor or the processing module 230 may generate the popularity information of each of the POIs according to the number of the respective original data, and then present the differences between the popularities of the filtered POIs in the electronic map according to the popularity information via the interface module 210. For example, the differences between the popularities of the filtered POIs may be presented in visually recognizable ways. In one embodiment, a plurality of ranks representing different numbers may be predetermined to identify popularities of the filtered POIs. For example, if the number of the respective original data is within the range between 0 to 20, the popularity of the corresponding POI may be determined to be "Plain"; if the number of the respective original data is within the range between 20 to 50, the popularity of the corresponding POI may be determined to be "Hot"; if the number of the respective original data is over 50, the popularity of the corresponding POI may be determined to be "Extremely Hot". Alternatively, the number of the respective original data may be used as the popularity information, or the popularity information may be obtained by applying a specific equation, e.g., setting different weights for the sources of the original data (including blog websites, web forums, social websites, web albums, and web pages, etc.) and/or the type of the original data (including articles, photographs, and check-in information, etc.) to be used in the equation, and using the result of the equation to be the popularity information. In this embodiment, as shown in FIG. 7, the POIs with higher popularities are marked with larger signs. Alternatively, the popularity information (such as the ranks or the result of the equation) may be indicated along with the corresponding POIs in the electronic map. In another embodiment, the POIs with popularities over a specific rank may be marked with an extra sign, such as a flag, or a crown, etc., for the user to easily identify with. Alternatively, each of the POIs may be presented with a respective number for indicating the sorted sequence of popularities of the POIs, like a ranking list. In yet another embodiment, the user may input a specific type of POI, such as "restaurant", or "scenic spot", etc., in the search input column or another input column, to further narrow down the search.

Figure 8:
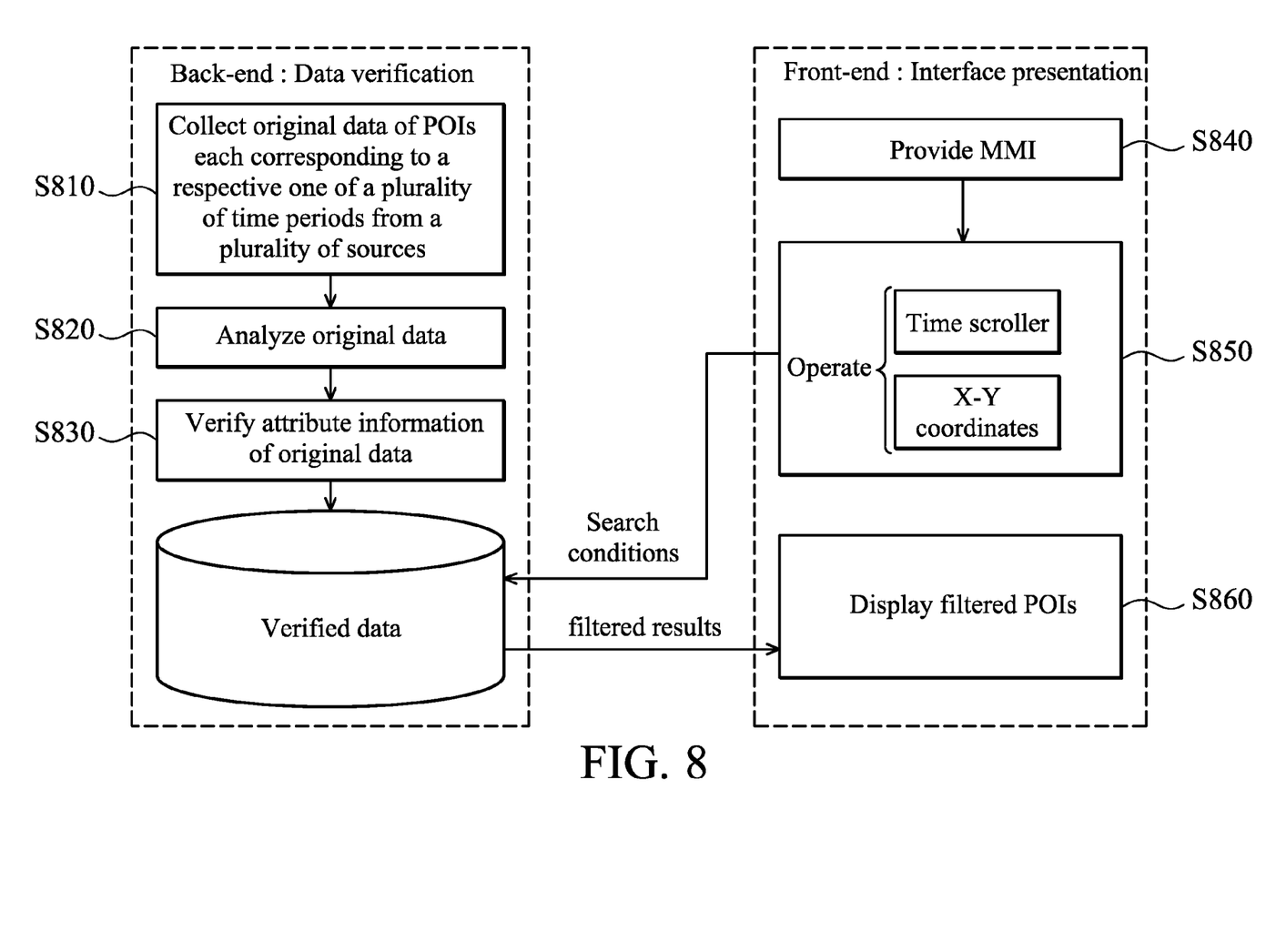
FIG. 8 is a flow chart illustrating the method for presenting POI information in an electronic map according to another embodiment of the invention.

FIG. 8 is a flow chart illustrating the method for presenting POI information in an electronic map according to another embodiment of the invention. As shown in FIG. 8, the flow chart is an overall operation combining the presentation of the POI information and the data verification. The steps S810 to S830 are similar to the steps S410 to S430 in FIG. 4, and the steps S840 to S860 are similar to the steps S310 to S340 in FIG. 3, so related description is omitted here for brevity. The difference between this embodiment and the embodiment of FIG. 3 lies in the interface presentation, wherein the interface presentation in this embodiment provides an MMI comprising a time scroller and an electronic map with X-Y coordinates via an interface module (step S840). In the MMI, the user may operate the time scroller and operate the X-Y coordinates for enlarging, reducing, or moving the display area in the electronic map, to input the conditions of the search (step S850). Subsequently, the processor screens a plurality of POIs and the verified data of the POIs corresponding to each of the different time periods according to the conditions of the search, and then displays the electronic map to present the filtered POIs (step S860).

The method for presenting POI information in an electronic map, or any forms for carrying out the method, or any parts thereof may be implemented in computer program, wherein the computer program may be stored in any machine-readable storage medium, such as a floppy disc, hard disc, optical disc, or computer program product with any external form. Particularly, when the computer program is loaded and executed by an electronic device, e.g., a computer, the electronic device becomes an apparatus or system for performing the steps of the method for presenting POI information in an electronic map. Alternatively, the computer program may be transferred via certain transferring media, such as electric wires/cables, optical fibers, or others.

Correspondingly, the invention also proposes a machine-readable storage medium comprising a computer program, which, when executed, causes an electronic device to perform the method for presenting POI information in an electronic map. The steps of the method are as described above and, thus, detailed description of the method is omitted here for brevity.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A map system for presenting Point of Interest (POI) information, comprising:
    an interface module, coupled to a display device, providing an operation interface for receiving a search query and a condition of time period;
    a storage unit, storing a plurality of POIs data, verified data of the POIs each corresponding to a respective one of a plurality of time periods, and standard attribute information of each of the POIs; and
    a processing module, collecting original data of the POIs corresponding to the time periods from a plurality of sources, analyzing the original data of each of the POIs corresponding to each of the time periods to generate attribute information for the original data of each of the POIs corresponding to each of the time periods, comparing the generated attribute information with the standard attribute information to determine a number of respective original data whose attribute information matches with the standard attribute information of the respective POI, generating the verified data according to the number of the respective original data, filtering the POIs and the verified data according to the search query and the condition of time period to generate an electronic map, and displaying the electronic map to present the filtered POIs via the interface module and the display device,
    wherein the respective original data has an attribute-counted number which exceeds a threshold value, and the attribute-counted number is an amount for the attribute information of the respective original data, which is the same as the standard attribute information of the respective original data.

2. The map system of claim 1, wherein the processing module further performs a semantic analysis for at least one of contents, tags, titles, notations, abstracts, and descriptions of the original data to generate the attribute information.

3. The map system of claim 1, wherein, when the sources comprise social networks and web albums and the original data comprises photographs, checkin information, and geographic information, the processing module further analyzes tags, titles, and descriptions of the photographs, the checkin information, and the geographic information, for the generation of the attribute information.

4. The map system of claim 1, wherein the processing module further performs one of the following for generating the verified data:
    using the number of the respective original data as the verified data, and determining the POIs with the verified data which is greater than zero as the filtered POIs;
    setting the verified data of a respective POI to indicate that the respective POI has been successfully verified when the number of the respective original data of each of the POIs exceeds another threshold value, and setting the verified data of a respective POI to indicate that the respective POI has not been successfully verified when the number of the respective original data of each of the POIs is less than the another threshold value; and
    setting a respective weight for each of the sources, and accumulating products of the number of the respective original data from each of the sources and the corresponding weight, to generate the verified data.

5. The map system of claim 1, wherein the processing module further periodically collects the original data, analyzes the original data for generating the attribute information, and compares the attribute information with the standard attribute information, to update the generation of the verified data, and stores the updated verified data in the storage unit.

6. The map system of claim 1, wherein the processing module further generates popularity information of each of the POIs according to the number of the respective original data, and presents the filtered POIs with different presentations corresponding to differences between the popularity information in the electronic map via the interface module and the display device.

7. The map system of claim 1, wherein the operation interface comprises an input column and a time scroller for a user to input the search query and the condition of time period, respectively, wherein the time scroller is operable to indicate a time from which a search time period corresponding to the condition of time period is reversed back, and the processing module further updates the displayed filtered POIs in the electronic map via the interface module and the display device when the time scroller is operated to modify the condition of time period.

8. A method for presenting Point of Interest (POI) information in an electronic map, executed by a processor, comprising:
providing an operation interface for receiving a search query and a condition of time period;
retrieving, from a storage unit, a plurality of POIs data, verified data of the POIs each corresponding to a respective one of a plurality of time periods, and standard attribute information of each of the POIs;
collecting original data of the POIs corresponding to the time periods from a plurality of sources, wherein the respective original data has an attribute-counted number which exceeds a threshold value, and the attribute-counted number is an amount for the attribute information of the respective original data, which is the same as the standard attribute information of the respective original data;
analyzing the original data of each of the POIs corresponding to each of the time periods to generate attribute information for the original data of each of the POIs corresponding to each of the time periods;
comparing the generated attribute information with the standard attribute information to determine a number of respective original data whose attribute information matches with the standard attribute information of the respective POI;
generating the verified data according to the number of the respective original data;
filtering the POIs and the verified data according to the search query and the condition of time period to generate the electronic map; and
displaying the electronic map to present the filtered POIs via a display device.

9. The method of claim 8, further comprising: performing a semantics analysis for at least one of contents, tags, titles, notations, abstracts, and descriptions of the original data to generate the attribute information.

10. The method of claim 8, wherein, when the sources comprise social networks and web albums and the original data comprises photographs, checkin information, and geographic information, the step of analyzing the original data for the generation of the attribute information further comprises analyzing tags, titles, and descriptions of the photographs, the checkin information, and the geographic information.

11. The method of claim 8, further comprising one of the following steps for generating the verified data:
using the number of the respective original data as the verified data, and determining the POIs with the verified data which is greater than zero as the filtered POIs;
setting the verified data of a respective POI to indicate that the respective POI has been successfully verified when the number of the respective original data of each of the POIs exceeds another threshold value, and setting the verified data of a respective POI to indicate that the respective POI has not been successfully verified when the number of the respective original data of each of the POIs is less than the another threshold value; and
setting a respective weight for each of the sources, and accumulating products of the number of the respective original data from each of the sources and the corresponding weight, to generate the verified data.

12. The method of claim 8, further comprising:
periodically performing the steps of collecting the original data, analyzing the original data for generating the attribute information, and comparing the attribute information with the standard attribute information, to update the generation of the verified data; and
storing the updated verified data in the storage unit.

13. The method of claim 8, further comprising:
generating popularity information of each of the POIs according to the number of the respective original data; and
presenting the filtered POIs with different presentations corresponding to differences between the popularity information in the electronic map via the display device.

14. The method of claim 8, wherein the operation interface comprises an input column and a time scroller for a user to input the search query and the condition of time period, respectively, wherein the time scroller is operable to indicate a time from which a time period corresponding to the condition of time period is reversed back, and the method further comprises updating the presented filtered POIs in the electronic map via the display device when the time scroller is operated to modify the condition of time period.

15. A machine-readable storage medium comprising a computer program, which, when executed, causes an electronic device to perform a method for presenting Point of Interest (POI) information in an electronic map, wherein the method comprises:
providing an operation interface for receiving a search query and a condition of time period;
retrieving, from a storage unit, a plurality of POIs data, verified data of the POIs each corresponding to a respective one of a plurality of time periods, and standard attribute information of each of the POIs;
collecting original data of the POIs corresponding to the time periods from a plurality of sources, wherein the respective original data has an attribute-counted number which exceeds a threshold value, and the attribute-counted number is an amount for the attribute information of the respective original data, which is the same as the standard attribute information of the respective original data;
analyzing the original data of each of the POIs corresponding to each of the time periods to generate attribute information for the original data of each of the POIs corresponding to each of the time periods;
comparing the generated attribute information with the standard attribute information to determine a number of respective original data whose attribute information matches with the standard attribute information of the respective POI;
generating the verified data according to the number of the respective original data;
filtering the POIs and the verified data according to the search query and the condition of time period to generate the electronic map; and
displaying the electronic map to present the filtered POIs via a display device.

* * * * *